United States Patent Office 2,862,922
Patented Dec. 2, 1958

2,862,922

METHOD OF MAKING SODIUM CELLULOSE SULFATE

Donald B. Sparrow, Moylan, Pa., and William R. Powers, Penns Grove, N. J., assignors to Scott Paper Company, Chester, Pa., a corporation of Pennsylvania No Drawing. Application July 20, 1954
Serial No. 444,668

4 Claims. (Cl. 260—215)

The present invention relates to a novel method of preparing inorganic salts of sulfuric acid esters of polymeric carbohydrates; and, more particularly, it relates to a novel method of preparing inorganic salts of sulfuric acid esters of cellulose, such as, for example, sodium cellulose sulfate.

Inorganic salts of sulfuric acid esters of polymeric carbohydrates, especially of cellulose, are known materials. The most common compounds of this class are the sodium cellulose sulfates. Various methods for preparing such salts have been suggested in the past. Most of these methods have involved, first of all, the reaction of the cellulose with a strong sulfur acid, such as sulfuric acid, following which the resulting sulfuric acid ester of cellulose is neutralized to provide the desired salt. Investigators have also suggested the use of sulfur trioxide, sulfamic acid, and chlorsulfonic acid in place of the sulfuric acid. Because of the strong degrading influence of the acid on the cellulose it has been suggested to carry out the reaction in a medium such as pyridine, which minimizes this degrading effect. For instance, it has been suggested to react cellulose with chlorsulfonic acid in the presence of a large excess of pyridine. The large excess of pyridine was believed necessary to moderate the degrading effect of the acid and to combine with the hydrogen chloride produced during the reaction. The pyridine salt of cellulose sulfuric acid was formed in solution in the pyridine, and this pyridine salt was converted to the desired inorganic salt by metathesis. In a further effort to minimize degradation by these prior methods it has usually been found necessary to employ low reaction temperatures and hence long reaction time. Large excesses (up to several hundred percent) of acid esterifying agent are also usually required in these prior methods.

In addition, all of these procedures comprise two main steps, namely, the reaction between the cellulose and the acid followed by neutralization or metathesis to provide the desired inorganic salt. Because of the number of steps involved, these procedures are costly and have not achieved any significant commercial success in spite of the fact that sodium cellulose sulfate, for example, possesses valuable properties, as, for instance, a detergency promotor. Furthermore, in some of the suggested procedures, such as those involving the use of chlorsulfonic acid and excess pyridine, the product goes into solution in the reaction medium necessitating additional recovery steps.

It is the principal object of the present invention to provide a method of preparing inorganic salts of sulfuric acid esters of polymeric carbohydrates wherein the desired salt is formed directly in but a single reaction step.

Another object of the invention is to provide a novel method of preparing inorganic salts of sulfuric acid esters of polymeric carbohydrates wherein no free strong acid is required, and hence wherein the degrading influence of strong acid on the polymeric carbohydrate molecule is not a problem that must be met with expedients which introduce other disadvantageous conditions such as low reaction temperatures and hence long reaction time, large excesses of basic reaction medium, and the like.

Another object of the invention is to provide a method for preparing inorganic salts of sulfuric acid esters of polymeric carbohydrates wherein large excesses of esterifying agent are not required.

A further object is to provide an economical method of preparing ammonium or metal salts of sulfuric acid esters of cellulose wherein the desired salt is produced directly during a single reaction stage and without danger of degrading the cellulose molecule substantially.

Still another object of the invention is to provide a novel method of preparing ammonium or metal salts of sulfuric acid esters of cellulose wherein the desired product is produced directly as a solid in the reaction medium.

Further objects will be apparent from a consideration of the following specification and claims.

The process of the present invention comprises reacting, under substantially anhydrous conditions, a polymeric carbohydrate and an inorganic chlorsulfonate in an anhydrous liquid which is inert to the inorganic chlorsulfonate and thereafter separating the resulting inorganic salt of the sulfuric acid ester of the carbohydrate from the reaction medium.

As stated, the process of the present invention is broadly applicable to the conversion of polymeric carbohydrates into inorganic salts of the sulfuric acid esters thereof. Such polymeric carbohydrates containing esterifiable nuclei, are, for example, cellulose, hemicellulose, starch, mannan, the natural gums, such as locust bean, guar, arabic, accacia, tragacanth, karaya, and the like. These materials are readily degraded by strong acid, and hence are converted into inorganic salts of sulfuric acid esters thereof only with difficulty by prior methods. The process is particularly applicable to the preparation of inorganic salts of the sulfuric acid esters of cellulose from cellulose. Hence, cellulose is the preferred material employed in accordance with the present process. The cellulose may be obtained from any desired source thereof, such as wood pulp, cotton linters, bagasse pulp, straw and the like, wood pulp and cotton linters, especially the former, being particularly preferred sources of cellulose for use in this process. Since cellulose is the preferred material treated in accordance with the present invention, the process will be further described in terms of the employment thereof.

The cellulose will be in reactive form, that is to say, it will be cellulose that has not had its normal reactivity excessively impaired through harsh drying. However, during the reaction, the cellulose will be in an anhydrous condition, and this anhydrous yet reactive state may be achieved by procedures well known in the art. The conventional procedures for removing water from cellulose without rendering it inactive generally involve removing the last portion of water by displacement with an anhydrous liquid. This may be accomplished by a simple displacement process wherein the cellulose, containing no less than about 2% of water, is washed with an anhydrous liquid miscible with water, such as glacial acetic acid. On the other hand, a combination of chemical removal and displacement may be resorted to, as by soaking the moist cellulose in a mixture of acetic anhydride and glacial acetic acid, the anhydride combining with the water forming acetic acid.

One of the preferred sources of cellulose is, as stated, wood pulp. In this case it is advantageous to employ "never-dried" pulp, removing excessive water if necessary by ordinary drying or mechanical, e. g. pressing, procedures, so that the water content of the pulp is below about 70% but still in excess of about 2%, preferably in excess of about 3%, and then displacing the remaining water as described above.

Of course, should the cellulose available or obtainable be of a low order of activity, a substantial part of its normal reactivity can be restored by well known expedients. For example, relatively inactive cellulose may be reactivated by treating in hot boiling water, with or without added reagents. The water may then be removed from the reactivated material as described above.

In accordance with the present invention, the cellulose, or other polymeric carbohydrate of the type described, is reacted as such with an inorganic chlorsulfonate. The inorganic chlorosulfonates and their preparation are known. There are presently two conventional methods of preparing these materials: one involves reacting sulfur trioxide with an inorganic chloride, usually at between about 20 and about 100° C., and the other comprises reacting chlorsulfonic acid with an inorganic chloride or sulfate, usually at a temperature below about 50° C. When either procedure is followed, the exact structure of the product is not known. It is believed that, in either case, the product is actually a mixture of unreacted inorganic chloride (or sulfate), chlorsulfonate ($MClSO_3$) and pyrochlorsulfonate ($MClS_2O_6$). The chlorsulfonate ($MClSO_3$) may predominate in the reaction between chloride and sulfur trioxide or chlorsulfonic acid, while the pyrochlorsulfonate may predominate in the reaction between the inorganic sulfate and the chlorsulfonic acid. The exact relationship among the components in the product of either reaction is not important since by either procedure, using proportions to provide a substantially neutral product, the resulting material functions similarly in the present process. It will be understood from the foregoing that the term "chlorsulfonate" as used herein and in the claims refers generally to the products of the reactions discussed above as well as of equivalent procedures M, in the above formula, has been shown as a monovalent element solely for purposes of illustration, and, as will be discussed more in detail hereinafter, the chlorsulfonate employed may be any desired metal or ammonium.

As far as is presently known, the cation of the inorganic chloride or sulfate employed to prepare the chlorsulfonate, and hence of the chlorsulfonate itself as used in the present process, may be ammonium or any metal such as the alkali metals, for instance, sodium, potassium or lithium; the alkaline earth metals, such as, calcium, magnesium, barium and strontium; zinc; aluminum; chromium; iron; nickel; cobalt; copper; silver; gold; tin; manganese; lead; mercury; and the like. The inorganic cation of the chlorsulfonate employed in the process of the invention determines the type of salt produced as the result of the process. Since the ammonium and the alkali metal cellulose sulfates, especially sodium cellulose sulfate, are presently the most common materials in the class under discussion, the use of an ammonium or alkali metal chlorsulfonate, particularly sodium chlorsulfonate, as the reactant is presently preferred.

The reaction between the cellulose and the chlorsulfonate in accordance with the present invention takes place in an anhydrous liquid medium which serves to distribute the chlorsulfonate thoroughly throughout the cellulose. For this purpose the amount of liquid employed may vary widely from that just sufficient to wet the cellulose mass providing a plastic dough up to that providing a fluid slurry. The chlorsulfonate need not be highly soluble in the liquid employed so long as it is sufficiently soluble to permit the reaction to be initiated, further inorganic chlorsulfonate going into the solution as the reaction proceeds. The anhydrous liquid serving as reaction medium will, however, be inert, that is non-reactive, to the inorganic chlorsulfonate reactant under the conditions of the reaction, and will have no significant degrading or other deleterious altering effect on the cellulose under the conditions of the reaction. In addition, the liquid must not dissolve any significant portion of the resulting product or have any degrading effect thereon, one of the important features of the present process being the recovery of the cellulose sulfate salt in solid form directly from the reaction medium. There is a wide variety of organic liquids available which may be employed as the reaction medium, including liquid aliphatic hydrocarbons, and chlorinated hydrocarbons, liquid fatty acids, liquid fatty acid anhydrides, liquid fatty acid esters, liquid ethers, and the like. Mixtures of one or more of these types of liquids may be employed; for example, a mixture containing a major amount of inexpensive hydrocarbon with a minor amount of, for example, a lower fatty acid or ester thereof. A particularly advantageous reaction medium is glacial acetic acid. Other materials may be incorporated in the reaction medium for special purposes.

The relative proportions of the inorganic chlorsulfonate reacted with the cellulose may vary somewhat depending upon the nature of the product desired. Each anhydroglucose unit in the cellulose molecule contains three hydroxyl groups which are available for esterification. The average number of sulfate salt groups introduced into the anhydro-glucose unit may, therefore, vary from slightly above 0 to 3 where all the hydroxyl groups in each anhydro-glucose group have been substituted. The average number of sulfate salt groups introduced into each anhydro-glucose unit is referred to as the degree-of-substitution. The degree-of-substitution of an inorganic salt of a sulfuric acid ester of cellulose largely determines the product's properties. With sodium cellulose sulfates, for example, those having a degree-of-substitution less than about 0.3 are insoluble in water but may be soluble in dilute alkaline solutions if the degree-of-substitution is above about 0.15. Sodium cellulose sulfates having a degree-of-substitution of from about 0.4 to about 0.9 are highly effective as detergency promotors, while the detergency promoting properties fall off at degrees-of-substitution above about 1 until those having a degree-of-substitution above about 2 have little detergency promotion properties. The present invention, however, is not primarily concerned with the specific uses or properties of the final product but rather with a method of preparing the various materials referred to as inorganic salts of sulfuric acid esters of cellulose. Hence, in accordance with the broader aspects of the invention, the proportion of inorganic chlorsulfonate reacted with the cellulose is relatively immaterial and may vary widely from as much as three equivalents of the inorganic chlorsulfonate per anhydroglucose unit of the cellulose molecule to as low as about .05 equivalent. In practice, it is preferable to employ an excess of chlorsulfonate over that theoretically required to produce the desired degree-of-substitution. Particularly advantageous results are obtained when the amount of chlorsulfonate employed is between about 50 and about 100% in excess of that theoretically required.

To commence the reaction, the cellulose and the chlorsulfonate are mixed together in the anhydrous liquid, and preferably with agitation which is continued during at least the major portion part of the reaction. The materials may be mixed together in any order, although for the sake of ease of dispersion it is desirable to suspend the cellulose in the main portion of the anhydrous liquid, add the chlorsulfonate to the remaining liquid and add the latter mixture to the cellulose suspension.

The reaction is conducted in the absence of any significant amount of free moisture. Hence, as stated above, the liquid reaction medium will be anhydrous, and the cellulose must also be in an anhydrous condition during the reaction. The reaction itself is conducted under substantially anhydrous atmospheric conditions. It has been found that the higher the humidity of the air contacting the reacting mass the less satisfactory is the process. If the prevailing atmospheric conditions are dry, that is to say, if the relative humidity is low, the reaction may be carried out in an open system. During relatively humid weather, however, the process may be carried out in a closed system in which case the air contacting the reaction mass may be artificially dried. As a practical matter due to fluctuations in atmospheric conditions it is advisable to employ a closed system with means for artificially drying air. Other dry gaseous atmospheres than air may also be employed.

The temperature of the reaction mass during the reaction may vary widely from room temperature up to the boiling point of the liquid medium employed, or even higher when pressure is employed. Generally, however, the temperature of the reaction medium will not exceed about 120° C. nor be below about 30° C. Preferably, the reaction is carried out at a temperature between about 45 and about 90° C.

During the reaction, hydrogen chloride is liberated, and this may be conveniently removed from the system as by the use of vents or by other convenient means.

When the reaction has proceeded to the desired extent, the product, which will be in solid form in the reaction medium, may be removed from the reaction medium such as by filtering, centrifuging, or the like, and the remaining liquid removed as by evaporation. It may be desirable, before final removal of residual liquid, to wash free the product of any unreacted chlorsulfonate, by-products, or the like. For this purpose there may be used one of the anhydrous liquids referred to above. Advantageously, water is included in the washing liquid to hydrolyze any unreacted inorganic chlorsulfonate. A material to remove any hydrogen chloride remaining in the product is also advantageously included in the washing medium. A particularly advantageous washing medium is aqueous acetic acid containing sodium acetate. Another method of washing involves the use of aqueous methanol or ethanol with the adjustment of the pH of the slurry to neutrality with aqueous alkali.

It will be seen from the foregoing that the process of the present invention permits the conversion of cellulose directly in one step, into an inorganic salt of cellulose sulfuric acid ester. Because no strong acid is required during the reaction, degradation of the cellulose molecule is minimized, and elevated reaction temperature with correspondingly low reaction times may be employed. It was also unexpected that the hydrogen chloride liberated under the anhydrous conditions of the reaction has no significant deleterious effect on the cellulose. The amount of esterifying agent required by the present process is much less than that required by prior methods. Moreover, by the present procedure, the desired salt may be recovered directly from the reaction medium as a solid product. The degree of substitution can readily be controlled to provide products with desired characteristics.

The process of the present invention will be more clearly understood from a consideration of the following specific examples which are given for the purpose of illustration and are not intended to limit the scope of the invention in any way:

*Example I*

To 15.3 parts of sulfite pulp in sheet form (containing about 5% moisture) were added 22.5 parts of glacial acetic acid and 22.5 parts of acetic anhydride. The mixture is allowed to stand for about two hours at room temperature.

To 6.8 parts of dried powdered sodium chloride are added 10.8 parts of commercial chlorsulfonic acid. The resulting paste is stirred until a dry powder results.

The pulp is transferred to a vessel equipped with a high speed agitator and a heating mantle. 230 parts of glacial acetic acid are added and the pulp is defibered for 2 to 3 minutes. The sodium chlorsulfonate prepared above is dissolved in 100 parts glacial acetic acid and added to the pulp slurry. The slurry is then heated to 60° C. and maintained at that temperature for about 20 minutes under agitation. The slurry is then filtered immediately. The wet sodium cellulose sulfate cake is then slurried for 10 minutes in a wash liquid consisting of 196 parts of glacial acetic acid, 4 parts of water and 4 parts of sodium acetate. The slurry is then filtered, and the white cake is broken into small crumbs, spread out in an oven and dried for 24 hours at 60° C. The resulting product is a white fibrous powder, soluble in water. A 2% aqueous solution exhibits a viscosity of 250 cp. Its sulfur content indicates a degree-of-substitution of 0.7. Added in small amounts to a detergent it showed a marked ability to reduce soil deposition in a simulated laundering test.

*Example II*

Never-dried, bleached wood pulp, produced by the sulfate pulping process and having an alpha cellulose content of about 85%, is pressed to a consistency of 35%. The pulp is then alternately slurried with fifteen times its dry weight of glacial acetic acid and pressed, three times, to give an acetic acid-wet pulp of 40% consistency.

To fifteen parts of the above pulp (dry basis) are added 22.5 parts of acetic anhydride and 330 parts of glacial acetic acid. The slurry is then placed in a vessel equipped with an agitator and heating mantle.

To 8.8 parts of dry, powdered sodium chloride are added 16.2 parts of chlorsulfonic acid. The resulting paste is stirred until a dry powder results.

The sodium chlorsulfonate thus prepared is added to the pulp slurry, and the resulting mixture is heated and maintained at 60° C. for twenty minutes under agitation. The slurry is then filtered immediately.

The sodium cellulose sulfate cake is then slurried for ten minutes in 200 parts of 96% acetic acid. The mixture is then filtered, the cake broken into small crumbs, and these dried in an oven for 24 hours at 60° C.

The resulting product is a white fibrous product, soluble in water to give a viscous colloidal solution.

Considerable modification is possible in the selection of the particular ingredients and conditions employed during the reaction without departing from the scope of the present invention.

We claim:

1. The method of making sodium cellulose sulfate which comprises reacting cellulose with sodium chlorsulfonate in an anhydrous medium consisting of a mixture of acetic anhydride and glacial acetic acid.

2. The method of making sodium cellulose sulfate which comprises reacting cellulose with from about 0.05 to 3 equivalents of sodium chlorsulfonate in an anhydrous medium consisting of a mixture of acetic anhydride and glacial acetic acid.

3. The method of making sodium cellulose sulfate which comprises working cellulose with a mixture of glacial acetic acid and acetic anhydride in an amount sufficient to wet the cellulose and to eliminate therefrom substantially all residual moisture, adding from about 0.05 to 3 equivalents of sodium chlorsulfonate in solution in glacial acetic acid to the acid-wetted cellulose, heating the mixture to a temperature of from 30 to 120° C. for reaction of the sodium chlorsulfonate with the cellulose and recovering sodium cellulose sulfate in solid form from the reaction mixture.

4. The method of making sodium cellulose sulfate which comprises forming a substantially anhydrous slurry of cellulose in a mixture of glacial acetic acid and acetic anhydride, adding from about 0.05 to 3 equivalents of sodium chlorsulfonate in solution in glacial acetic acid to said slurry, heating the resultant mixture to a temperature of from 30 to 120° C., maintaining said mixture at the elevated temperature until cessation of the liberation of hydrogen chloride resulting from the reaction of the sodium chlorsulfonate with the cellulose, and recovering sodium cellulose sulfate in solid form from the reaction mixture.

References Cited in the file of this patent

UNITED STATES PATENTS

| | | |
|---|---|---|
| 1,866,532 | Haskins | July 12, 1932 |
| 2,290,167 | Datin | July 21, 1942 |
| 2,675,377 | Malm et al. | Apr. 13, 1954 |
| 2,686,779 | Jones | Aug. 17, 1954 |
| 2,714,591 | Klug et al. | Aug. 2, 1955 |

FOREIGN PATENTS

| | | |
|---|---|---|
| 303,493 | Great Britain | 1930 |